(12) United States Patent
Washiro

(10) Patent No.: US 8,391,784 B2
(45) Date of Patent: Mar. 5, 2013

(54) COMMUNICATION DEVICE AND HIGH-FREQUENCY COUPLER

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 314 days.

(21) Appl. No.: 12/728,945

(22) Filed: Mar. 22, 2010

(65) Prior Publication Data

US 2010/0248625 A1 Sep. 30, 2010

(30) Foreign Application Priority Data

Mar. 30, 2009 (JP) ................ P2009-080792

(51) Int. Cl.
| | |
|---|---|
| *H04B 5/00* | (2006.01) |
| *H04B 1/18* | (2006.01) |
| *H04B 7/00* | (2006.01) |
| *H03H 9/00* | (2006.01) |
| *H04M 1/00* | (2006.01) |
| *H01Q 17/00* | (2006.01) |
| *H01Q 1/22* | (2006.01) |
| *H01Q 9/00* | (2006.01) |
| *H01Q 9/04* | (2006.01) |
| *H01Q 1/50* | (2006.01) |

(52) U.S. Cl. ............. 455/41.1; 455/282; 455/562.1; 455/41.2; 342/1; 343/884; 343/745; 343/750; 343/790; 343/850; 333/195

(58) Field of Classification Search ............. 455/41.1, 455/41.2
See application file for complete search history.

(56) References Cited

U.S. PATENT DOCUMENTS

| | | | | |
|---|---|---|---|---|
| 6,657,514 | B1 * | 12/2003 | Tokudera et al. | 333/81 B |
| 2002/0130680 | A1 * | 9/2002 | Meyer et al. | 326/30 |
| 2004/0077313 | A1 | 4/2004 | Oba et al. | |
| 2005/0040991 | A1 * | 2/2005 | Crystal | 343/747 |
| 2005/0062472 | A1 * | 3/2005 | Bottomley | 324/317 |

(Continued)

FOREIGN PATENT DOCUMENTS

| | | |
|---|---|---|
| EP | 1 926 223 A2 | 5/2008 |
| JP | 2003-87263 | 3/2003 |

(Continued)

OTHER PUBLICATIONS

European Search Report mailed Jun. 9, 2010 in EP 10 15 7298.

(Continued)

*Primary Examiner* — Temesgh Ghebretinsae
*Assistant Examiner* — Devan Sandiford
(74) *Attorney, Agent, or Firm* — Finnegan, Henderson, Farabow, Garrett & Dunner LLP

(57) ABSTRACT

A communication device includes a communication circuit unit processing a high-frequency signal, a transmission path connected to the communication circuit, a ground, a coupling electrode supported so as to face the ground and to be separated by a height negligible with respect to a wavelength of the high-frequency signal, a resonating unit increasing a current flowing into the coupling electrode via the transmission path, and an extended section formed of a conductor disposed near a front of the coupling electrode with an angle θ formed relative to a direction of a microdipole being approximately 0 degree, the microdipole being formed of a line segment connecting a center of charges stored in the coupling electrode and a center of mirror-image charges stored in the ground, the conductor extended in a lateral direction approximately orthogonal to a propagating direction of an electric-field signal occurring from the front of the coupling electrode.

17 Claims, 18 Drawing Sheets

U.S. PATENT DOCUMENTS

| | | | |
|---|---|---|---|
| 2008/0064331 A1* | 3/2008 | Washiro | 455/41.1 |
| 2008/0076351 A1 | 3/2008 | Washiro | |
| 2008/0119135 A1* | 5/2008 | Washiro | 455/41.1 |
| 2008/0125036 A1* | 5/2008 | Konya et al. | 455/41.1 |
| 2009/0264067 A1* | 10/2009 | Pahlavan | 455/41.1 |
| 2010/0021176 A1* | 1/2010 | Holcombe et al. | 398/115 |

FOREIGN PATENT DOCUMENTS

| | | |
|---|---|---|
| JP | 2008-99234 | 4/2008 |
| JP | 2008-99236 | 4/2008 |
| JP | 2008-103993 | 5/2008 |

OTHER PUBLICATIONS

Transfer Jet, TransferJet™ Overview Whitepaper, TransferJet Consortium, pp. 1-10, (2009).

* cited by examiner

PRIOR ART

PRIOR ART

PRIOR ART

PRIOR ART

TERMINATOR (RESISTOR)          TERMINATOR (RESISTOR)

PRIOR ART

PRIOR ART

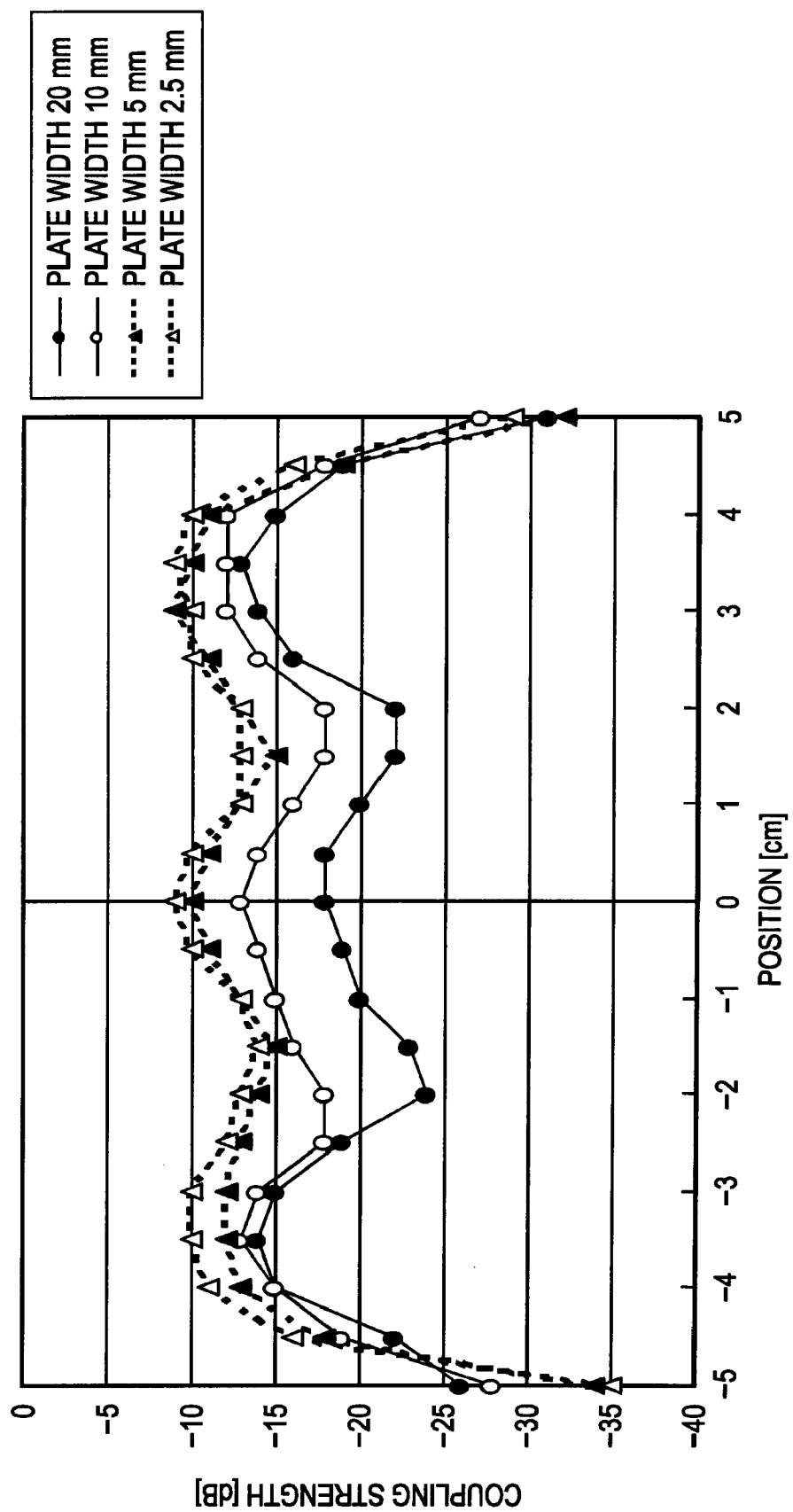

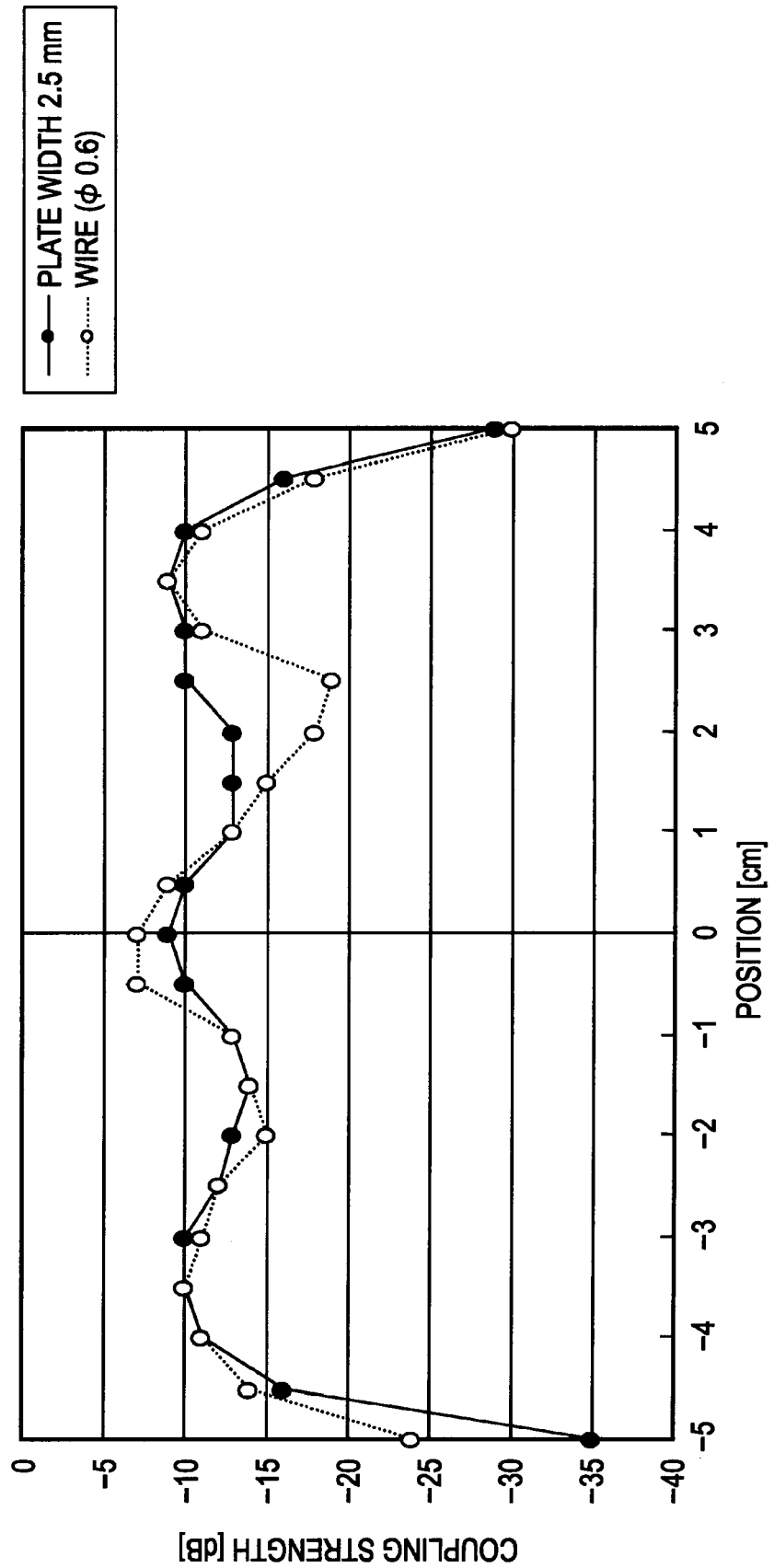

COMMUNICATION DEVICE AND HIGH-FREQUENCY COUPLER

BACKGROUND OF THE INVENTION

1. Field of the Invention

The present invention relates to communication devices and high-frequency couplers for large-capacity data transmission in close proximity through a weak UWB communication technique using a high-frequency wide band and, in particular, to a communication device and high-frequency coupler with a communicable area being sufficiently extended in a lateral direction in weak UWB communications using electric-field coupling.

2. Description of the Related Art

Non-contact communication has been widely available as a medium for authentication information, electronic money, and other value information. Examples of an IC card standard complying with ISO/IEC 14443 include Type A, Type B, and FeliCa®. Furthermore, near field communication (NFC) developed by Sony Corporation and Koninklijke Philips Electronics N.V. is an RFID standard mainly defining specifications of an NFC communication device (reader/writer) communicable with an IC card of each of Type A, Type B, and FeliCa. In NFC, with the use of a band of 13.56 MHz, non-contact bidirectional communication of a close-proximity type (0 or more but 10 or less cm) can be performed through electromagnetic induction.

An example of a further application of a non-contact communication system is large-capacity data transmission, such as downloading or streaming of moving pictures and music. For example, it can be assumed that non-contact communication is used when a fee-based content is downloaded from a vending machine to a portable terminal or when a content is downloaded from a fee-based site to a portable terminal via a personal computer connected to the Internet. In this case, it is preferable that a single user operation of holding the portable terminal over a read surface suffices and the operation completes with the sense of the same access time as that for authentication and billing in the past. Therefore, a high communication rate is desired.

However, the communication rate in NFC communication, which is a typical example of non-contact communication, is approximately 106 kbps to 424 kbps, which is sufficient for personal authentication or billing process but is extremely slow compared with other general-purpose wireless communication (such as WiFi and Bluetooth). Also, in the technique in the past, such as NFC communication, an achievable maximum communication rate is up to 848 kbps at best, due to physical constraints, such as carrier frequency. Thus, it is difficult to expect a dramatic increase in rate in the future.

By contrast, an example of a close-proximity wireless transfer technology applicable to high-speed communication is TransferJet using a weak ultra wide band (UWB) signal (for example, refer to Japanese Unexamined Patent Application Publication No. 2008-99236 and www.transferjet.org/en/index.html (as of Mar. 23, 2009)). This close-proximity wireless transfer technology (TransferJet) is of a technique of basically transmitting a signal by using an electric-field coupling action, and a communication device for the technique includes a communication circuit unit processing a high-frequency signal, a coupling electrode disposed so as to be separated from a ground at a predetermined height, and an resonating unit efficiently supplying the high-frequency signal to the coupling electrode.

In weak UWB communications using an electric-field coupling action, its communication distance is approximately 2 cm to 3 cm, and the high-frequency coupler does not have a polarized wave but has a directivity of approximately the same extent both in a height direction and in a lateral direction. Therefore, the communication device using the high-frequency coupler has a substantially hemispherically domed communicable area.

On the other hand, in an NFC communication technique, a small-sized and low-height reader/writer module of a compact size suitable for incorporation has been developed and manufactured, and can be used as being implemented for use in various devices, such as a point of sales (POS) terminal, vending machine, and personal computer. For example, an information processing device of a notebook type is suggested in which a reader/writer module is incorporated in a palm rest portion of a keyboard of a main body and information is read from a non-contact IC tag nearby (for example, refer to Japanese Unexamined Patent Application Publication No. 2003-87263).

In the above-described usage pattern in which a reader/writer module is implemented in a device, a unit serving as a communication target, such as a portable terminal, is generally placed on a read surface of the device so as to advance into a communicable area. Now consider the case where this general practice is applied to the above-described weak UWB communication technique. With a portable terminal having a high-frequency coupler incorporated therein being placed on a read surface of the device, the distance between the high-frequency couplers is short, and the high-frequency coupler is in an approximately contact state. In this manner, the high-frequency coupler can be sufficiently close to the device to the extent of generating an electric-field coupling action occurs. Originally, the high-frequency coupler has a directivity of approximately the same extent both in a height direction and in a lateral direction (as described above). Even when the communication distance in the height direction (that is, a signal propagating direction) is short, if the communicable area is extended in the lateral direction (in other words, a direction orthogonal to the propagating direction), an area where the read surface, that is, the communication device, can be placed is extended, thereby making it easier for users to use. Since the high-frequency coupler is incorporated in a different place for each terminal, the distance between the high-frequency couplers varies even if each terminal is placed on the read surface of the device in a similar manner.

For example, a communication system of a weak UWB communication technique is suggested in which a surface-wave transmission line made of a linear member using a copper line or other conductors is disposed near a coupling electrode and an electric-field signal emitted from a coupling electrode of a transmitter propagates through the inside and surface of this transmission line to extend the distance between the electrodes (for example, refer to Japanese Unexamined Patent Application Publication No. 2008-99234). This system uses a property that the electric field proceeds along the surface of a conductor. That is, an electric field perpendicular to the surface-wave transmission line and a magnetic field winding around the outside of the surface-wave transmission line occur and, with the form of energy alternately changing between the electric field and the magnetic field, a surface-wave signal propagates far away.

However, the above-described communication system using a surface-wave transmission line extends the communication distance in the height direction (that is, the signal propagating direction), and does not extend the communicable area in the lateral direction (in other words, the direction orthogonal to the propagating direction). Also, along a longitudinal direction of the surface-wave transmission line, a strong portion and a weak portion periodically occur in the electric field so as to correspond to a maximum position and a node of a standing wave. Although users can intuitively know that communication quality is higher at places closer to the center of the read surface, the center of the surface-wave transmission line in a longitudinal direction does not necessarily have a high electric field strength (refer to Japanese Unexamined Patent Application Publication No. 2008-99234, FIGS. 31A to 31F). Therefore, it is difficult for the user to perform an intuitive operation.

As another example, a surface-wave transmission line is suggested having one end formed of a bundle of line materials with their end face attached to a coupling electrode at an appropriate position and angle for an excellent communication state and the other end unbundled with an end face of each of the line materials distributed over a flat coupling surface (for example, refer to Japanese Unexamined Patent Application Publication No. 2008-103993). With this, a coupling surface having a communicable area extended in the lateral direction can be provided. However, it is difficult to make a small-sized high-frequency coupler of low height via a surface-wave transmission line made of a bundle of line materials.

SUMMARY OF THE INVENTION

It is desirable to provide an excellent communication device and high-frequency coupler capable of performing large-capacity data transmission in close proximity through a weak UWB communication technique using a high-frequency wide band.

It is further desirable to provide an excellent communication device and high-frequency coupler capable of having a communicable area sufficiently extended in a lateral direction in weak UWB communications using electric-field coupling.

It is still further desirable to provide an excellent communication device and high-frequency coupler allowing a user to perform an intuitive operation for starting data transfer when the device is brought close to a read surface in weak UWB communications using electric-field coupling.

According to an embodiment of the present invention, a communication device includes a communication circuit unit processing a high-frequency signal transmitting data, a transmission path for the high-frequency signal, the transmission path being connected to the communication circuit unit, a ground, a coupling electrode supported so as to face the ground and to be separated by a height negligible with respect to a wavelength of the high-frequency signal, a resonating unit increasing a current flowing into the coupling electrode via the transmission path, and extended means formed of a conductor disposed near a front of the coupling electrode with an angle θ formed relative to a direction of a microdipole being approximately 0 degree, the microdipole being formed of a line segment connecting a center of charges stored in the coupling electrode and a center of mirror-image charges stored in the ground, the conductor extended in a lateral direction approximately orthogonal to a propagating direction of an electric-field signal occurring from the front of the coupling electrode.

Also, according to another embodiment of the present invention, the extended means of the communication device according to the embodiment described earlier has a thin rectangular sectional shape that is long in the propagating direction of the electric-field signal and has a narrow bottom surface, and is formed of a metal plate having a shape that is long in the lateral direction. Here, examples of the shape that is long in the lateral direction include a bar shape, a meander shape formed by folding one barstock, and a shape formed of radially combining bar-shaped metal plates.

Also, according to another embodiment of the present invention, the extended means of the communication device according to the embodiment described earlier has a shape that is long in the lateral direction, and includes a terminator at each end in the lateral direction. Here, according to another embodiment of the present invention, the terminator is a radio-wave absorbing sheet wound near the end of the extended means. Alternatively, according to another embodiment of the present invention, the terminator is an electric resistor short-circuiting the end of the extended means with the ground.

According to another embodiment of the present invention, a high-frequency coupler includes a transmission path for a high-frequency signal, a ground, a coupling electrode supported so as to face the ground and to be separated by a height negligible with respect to a wavelength of the high-frequency signal, a resonating unit increasing a current flowing into the coupling electrode via the transmission path, and extended means formed of a conductor disposed near a front of the coupling electrode with an angle θ formed relative to a direction of a microdipole being approximately 0 degree, the microdipole being formed of a line segment connecting a center of charges stored in the coupling electrode and a center of mirror-image charges stored in the ground, the conductor extended in a lateral direction approximately orthogonal to a propagating direction of an electric-field signal occurring from the front of the coupling electrode.

According to the embodiments of the present invention, an excellent communication device and high-frequency coupler can be provided capable of performing large-capacity data transmission in close proximity through a weak UWB communication technique using a high-frequency wide band.

According to the embodiments of the present invention, an excellent communication device and high-frequency coupler can be provided capable of having a communicable area sufficiently extended in a lateral direction in weak UWB communications using electric-field coupling.

According to the embodiments of the present invention, an excellent communication device and high-frequency coupler can be provided allowing a user to perform an intuitive operation for starting data transfer when the device is brought close to a read surface in weak UWB communications using electric-field coupling. A non-contact communication system of a weak UWB communication technique can be provided with a read surface having a communicable area sufficiently extended in a lateral direction even though in a short communication distance.

According to the embodiments of the present invention, a microdipole formed of a line segment connecting the center of charges stored in the coupling electrode and the center of mirror-image charges stored in the ground is formed. Furthermore, with a resonating action of the resonating unit, more charges are stored in the coupling electrode to increase the strength of the microdipole. An electric-field signal occurring from the front of the coupling electrode is maximized in a direction where the angle θ formed relative to a direction of the microdipole is approximately 0. The extended means disposed near the front of the coupling electrode is extended in a lateral direction approximately orthogonal to a propagating direction of the electric-field signal. The electric-field signal entering one end edge of the extended means from the coupling electrode propagates along the surface of the extended means approximately radially in the lateral direction, and is emitted into space again from the other end edge of the extended means. As a result, the transmission area of the electric-field signal is extended to an area that depends on the shape and dimension of each end edge of the metal plate. Therefore, a wide communicable area can be ensured.

According to the embodiment of the present invention, the electric-field signal occurring in a front direction of the coupling electrode does not enter a narrow bottom surface at one end edge of the metal plate, but goes around a side surface to proceed with an angle of incidence of approximately 90 degrees to be transformed to a transverse wave, which approximately radially propagates along the surface of the metal plate and is emitted into space again from the other end edge of the metal plate. Therefore, with the extended means formed of a metal plate having a shape that is long in the lateral direction, a wide communicable area can be ensured. Here, examples of the shape that is long in the lateral direction include a bar shape, a meander shape formed by folding one barstock, and a shape formed of radially combining bar-shaped metal plates.

With an electric-field signal propagating along a length direction of a conductor as the extended means being reflected at each end of the conductor, the electric field strength disadvantageously becomes nonuniform in the advantageously extended communicable area, due to the occurrence of a standing wave in the conductor. To get around this, according to the embodiments of the present invention, the extended means includes a terminator at each end. Therefore, the electric-field signal propagating along the length direction to arrive at the end can be terminated to prevent the occurrence of a reflected wave. As a result, a standing wave does not occur at the extended means. Therefore, an electric field stronger at portions closer to the center without having a weak electric field portion midway can be formed. Therefore, the user can have an intuitive feeling of operation capable of communication better at portions closer to the center of the read surface.

Further features and advantages of the present invention will become apparent by more detailed description based on embodiments of the present invention described below and the attached drawings.

BRIEF DESCRIPTION OF THE DRAWINGS

FIG. 24 illustrates results of measuring a coupling strength between high-frequency couplers with a varied height (plate width) of a metal plate, the metal plate having a terminator made of an electric resistor mounted on each end being used as an extended section;

FIG. 25 illustrates results of measuring a coupling strength between high-frequency couplers when a metal plate having a rectangular shape in cross section is used and when a wire is used, as an extended section;

DESCRIPTION OF THE PREFERRED EMBODIMENTS

Embodiments of the present invention are described below with reference to the drawings.

First, the operation principle of near-proximity high-speed wireless communication using a weak UWB communication technique is described.

Figure 1:
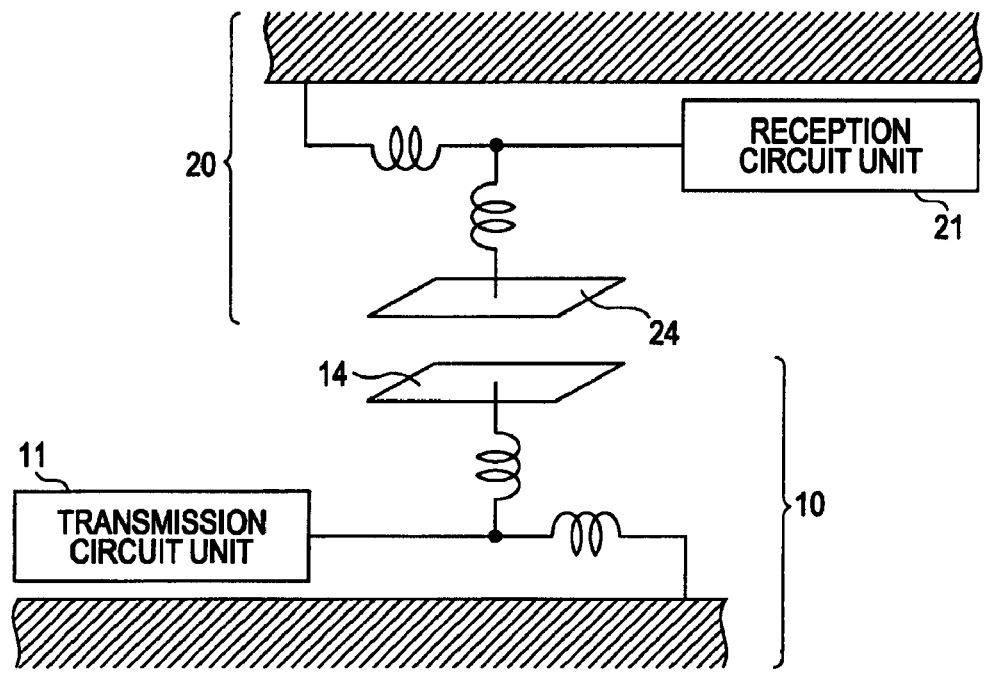
FIG. 1 schematically illustrates the structure of a near-proximity high-speed wireless communication system of a weak UWB communication technique using an electric-field coupling action.

FIG. 1 schematically illustrates the structure of a near-proximity high-speed wireless communication system of a weak UWB communication technique using an electric-field coupling action. In FIG. 1, a transmitter 10 and a receiver 20 have a coupling electrode 14 and a coupling electrode 24, respectively, for use in transmission and reception. These coupling electrodes 14 and 24 are disposed so as to face each other and be separated from each other by, for example, 3 cm, thereby allowing electric-field coupling. Upon a transmission request from a higher-level application, a transmission circuit unit 11 on a transmitter 10 generates a high-frequency transmission signal, such as a UWB signal, based on transmission data, and propagates the generated signal from the transmission coupling electrode 14 to the reception coupling electrode 24 as an electric-field signal. Then, a reception circuit unit 21 on a receiver 20 demodulates and decodes the received high-frequency electric-field signal, and passes reproduced data to the higher-level application.

According to the communication technique using a high-frequency wide band, such as UWB communication, ultra high-speed data transmission of approximately 100 Mbps can be performed in close proximity. Also, as described further below, when UWB communication is performed with the coupling action of an electrostatic field or induction field instead of a radiation field, the electric field strength is inversely proportional to the cube or square of the distance. Therefore, by suppressing the electric field strength at a distance of three meters from a wireless facility to be equal to or lower than a predetermined level, weak wireless without a license for a wireless station can be achieved, thereby configuring a communication system at low cost. Also, data communication is performed in close proximity with an electric-field coupling technique. Therefore, as one advantage, since a reflected wave from a reflector that is present nearby is small, the influence of interference is small. Furthermore, as another advantage, prevention of hacking or securing of confidentiality on the transmission path does not have to be taken into consideration.

On the other hand, as the propagation distance with respect to the wavelength increases, propagation loss increases. Therefore, to propagate a high-frequency signal through electric-field coupling, propagation loss is desired to be suppressed sufficiently low. In a communication technique of transmitting a high-frequency wide-band signal, such as a UWB signal, through electric-field coupling, even in close-proximity communication of approximately 3 cm, the distance is equivalent to an approximately ½ wavelength for a use frequency band of 4 GHz, and therefore the distance is not negligible. Among others, in a high-frequency circuit, the problem of characteristic impedance is serious compared with a low-frequency circuit, and an effect caused by an unmatching impedance becomes prominent at the coupling point between the electrodes of the transmitter and receiver.

In communication using a frequency of a kHz or MHz band, propagation loss in space is small. Therefore, the transmitter and the receiver each include a coupler formed of only an electrode. Even when the coupling portion operates simply as a parallel flat-plate capacitor, desired data transmission can be performed. By contrast, in communication for transmitting a signal by using high frequencies of a GHz band in a non-negligible distance with respect to the wavelength, propagation loss in space is large. Therefore, reflection of the transmission signal is desired to be suppressed to increase transmission efficiency. Even if a transmission path is adjusted to have a predetermined characteristic impedance at each of the transmitter and the receiver, impedance matching is difficult at the coupling portion as the parallel flat-plate capacitor. For example, in the communication system depicted in FIG. 1, even when a transmission path of a high-frequency electric-field signal coupling the transmission circuit unit 11 and the transmission coupling electrode 14 is a coaxial line with impedance matching of, for example, 50Ω, if the impedance at the coupling portion between the transmission coupling electrode 14 and the reception coupling electrode 24 is not matched, the electric-field signal is reflected to cause propagation loss, thereby decreasing communication efficiency.

Figure 2:
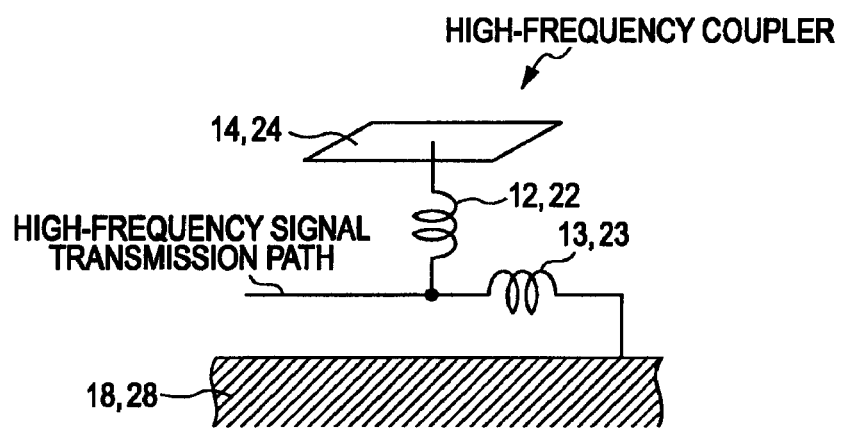
FIG. 2 illustrates the basic structure of a high-frequency coupler disposed in each of a transmitter and a receiver.

To get around this, as depicted in FIG. 2, the high-frequency coupler disposed in each of the transmitter 10 and the receiver 20 is configured so that a resonating unit including a flat-plate electrode 14, 24, a serial inductor 12, 22, and a parallel inductor 13, 23 is connected to a high-frequency signal transmission path connecting the transmission and reception circuit unit 11 and 21 and the coupling electrodes 14 and 24 together. Here, the high-frequency signal transmission path can be configured of a coaxial cable, microstrip line, coplanar line, or the like. When such high-frequency couplers are disposed so as to face each other, the coupling portion operates as a band-pass filter in extremely close proximity where a quasi-electrostatic field is dominant, thereby allowing transmission of a high-frequency signal. Also, even in a distance in which an induction field is dominant and which is not negligible with respect to the wavelength, a high-frequency signal can be efficiently transmitted between two high-frequency couplers via an induction field generated from a microdipole formed of charges and mirror-image charges stored in the coupling electrode and ground.

Here, if it is merely desired that simple impedance matching be ensured and a reflected wave be suppressed between the electrodes of the transmitter 10 and the receiver 20, that is, at the coupling portion, successive impedances at the coupling portion can be designed even with a simple structure of each coupler where the flat electrode 14, 24 and a serial inductor are connected in series on the high-frequency signal transmission path. However, the characteristic impedance is not changed before and after the coupling portion, and therefore the magnitude of a current is not changed. By contrast, with the provision of a parallel inductor 13, 23, a larger charge is fed to the coupling electrode 14, thereby producing a strong electric-field coupling action between the coupling electrodes 14 and 24. Also, when a large electric field is induced near the surface of the coupling electrode 14, the generated electric field propagates from the surface of the coupling electrode 14 as an electric-field signal of a longitudinal wave vibrating in a traveling direction (a direction of the microdipole, which will be described further below). With this electric-field wave, even if the distance between the coupling electrodes 14 and 24 (phase distance) is relatively long, the electric-field signal can be propagated.

Therefore, in the close-proximity wireless communication system of a weak UWB communication technique using an electric-field coupling action, conditions as a high-frequency coupler are as follows.

(1) There is a coupling electrode for coupling in an electric field at a position so as to face the ground and to be separated by a height negligible with respect to the wavelength of the high-frequency signal.

(2) There is a resonating unit (parallel inductor or stub) for coupling in a stronger electric field.

(3) The serial and parallel inductors, and the constant of a capacitor formed of coupling electrodes or the length of the stub are set so that impedance matching is ensured in a frequency band for use in communication when the coupling electrodes are placed so as to face each other.

In the communication system depicted in FIG. 1, when the coupling electrodes 14 and 24 of the transmitter 10 and the receiver 20 face each other as being separated from each other by an appropriate distance, two high-frequency couplers operate as a band-pass filter that lets an electric-field signal of a desired high-frequency band pass through and, as a single high-frequency coupler, each also operates as an impedance converter circuit that amplifies the current, thereby letting a current of a large amplitude flow into the coupling electrode. On the other hand, when the high-frequency coupler is placed in free space singly, the input impedance of the high-frequency coupler does not match the characteristic impedance of the high-frequency signal transmission path. Thus, a signal entering the high-frequency signal transmission path is reflected in the high-frequency coupler and is not emitted to the outside, and therefore does not influence other communication systems nearby. That is, when no counterpart for communication is present, the transmitter 10 does not send radio waves wastefully as an antenna, but ensures impedance matching only when a counterpart for communication comes near, thereby transferring a high-frequency electric-field signal.

Figure 3:
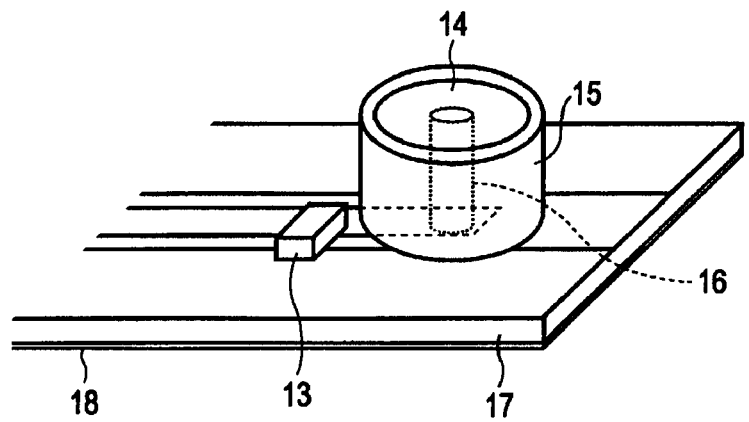
FIG. 3 illustrates an example of implementation of the high-frequency coupler depicted in FIG. 2.

FIG. 3 illustrates an example of implementation of the high-frequency coupler depicted in FIG. 2. The high-frequency coupler on either of the transmitter 10 and the receiver 20 can be configured similarly. In FIG. 3, the coupling electrode 14 is disposed on an upper surface of a spacer 15 formed of a dielectric shaped in a column, and is electrically connected to the high-frequency signal transmission path on the printed board 17 via a through hole 16 penetrating through the spacer 15.

For example, after the through hole 16 is formed in the column-shaped dielectric having a desired height, the through hole 16 is filled with a conductor, and a conductor pattern serving as the coupling electrode 14 is vapor-deposited on an upper end face of this column by, for example, plating technology. On the printed board 17, a wiring pattern serving as the high-frequency signal transmission path is formed. Then, with this spacer 15 implemented on the printed board 17 by reflow soldering or the like, a high-frequency coupler can be fabricated.

By appropriately adjusting the height from the circuit implementation surface of the printed board 17 to the coupling electrode 14, that is, the length of the through hole 16 (phase length) according to the use wavelength, the through hole 16 takes on an inductance, and can be used in place of the serial inductor 12 depicted in FIG. 2. Also, the high-frequency signal transmission path is connected to a ground 18 via a chip-shaped parallel inductor 13.

Here, an electromagnetic field occurring in the coupling electrode 14 on the transmitter 10 is studied below.

As depicted in FIGS. 1 and 2, the coupling electrode 14 is connected to one end of the high-frequency signal transmission path, and a high-frequency signal output from the transmission circuit unit 11 flows into the coupling electrode 14, where charges are stored. Here, with the resonant action of a resonating unit formed of the serial inductor 12 and the parallel inductor 13, the current flowing into the coupling electrode 14 via the transmission path is amplified, and larger charges are stored.

Also, the ground 18 is disposed so as to face the coupling electrode 14 and to be separated by a height (phase length) negligible with respect to the wavelength of the high-frequency signal. When charges are stored in the coupling electrode 14 as described above, mirror-image charges are stored in the ground 18. When a point charge Q is placed outside of a flat conductor, a mirror-image charge −Q (that is virtual with a replaced surface charge distribution) is disposed in the flat conductor, which is disclosed in, for example, Tadashi Mizoguchi, "Electromagnetism", (Shokabo Publishing Co., Ltd., pp. 54-57).

As a result, a microdipole is formed of a line segment connecting the center of the charges stored in the coupling electrode 14 and the center of the mirror-image charges stored in the ground 18. Precisely, the charge Q and the mirror-image charge −Q each have a volume, and the microdipole is formed so as to connect the center of the charge and the center of the mirror-image charge. The microdipole herein represents an electric dipole with a extremely short distance between charges, and is described also in, for example, Yasuto Mushiake, "Antenna and radio-wave propagation", (Corona Publishing Co., Ltd., pp. 16-18). With this microdipole, a transverse-wave component $E_\theta$ of the electric field, a longitudinal-wave component $E_R$ of the electric field, and a magnetic field $H_\phi$ around the microdipole occur.

Figure 4:
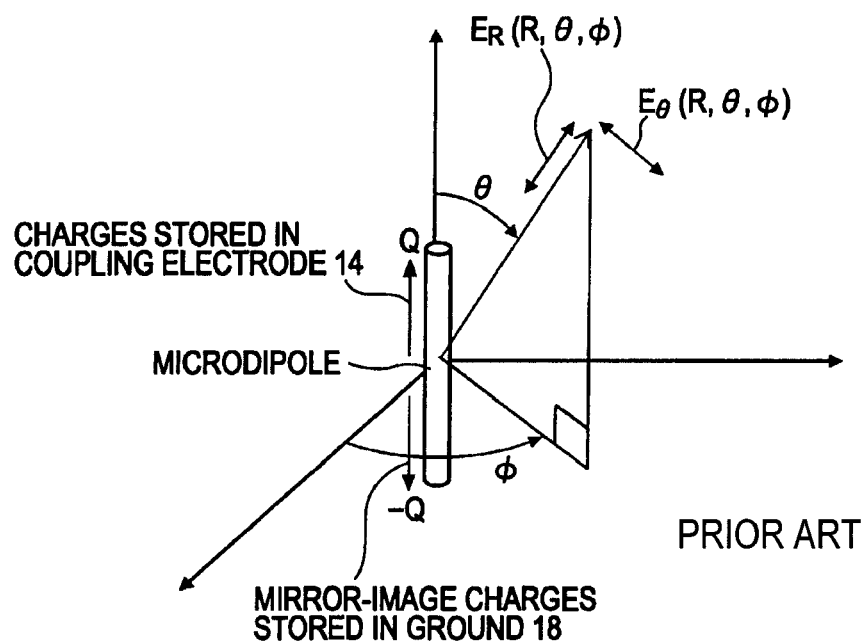
FIG. 4 illustrates an electromagnetic field caused by a microdipole.
Figure 5:
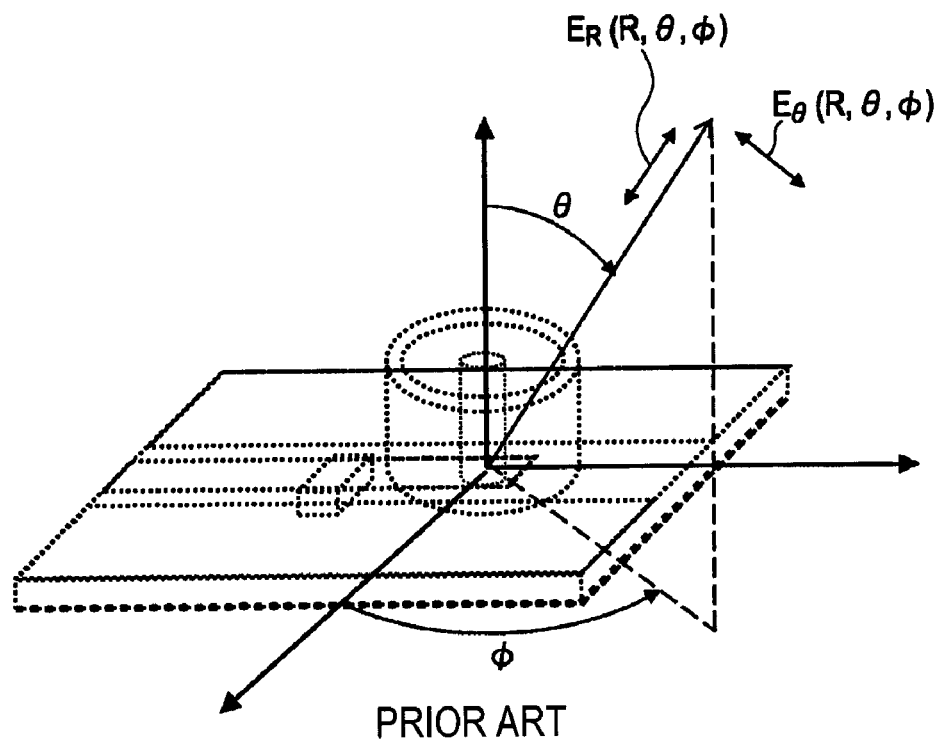
FIG. 5 illustrates the electromagnetic field depicted in FIG. 4 mapped on a coupling electrode.

FIG. 4 illustrates an electromagnetic field caused by a microdipole. FIG. 5 illustrates this electromagnetic field depicted mapped on the coupling electrode. As depicted in FIGS. 4 and 5, the transverse-wave component $E_\theta$ of the electric field vibrates in a direction perpendicular to a propagating direction, and the longitudinal-wave component $E_R$ of the electric field vibrates in an orientation parallel to the propagating direction. Around the microdipole, the magnetic field $H_\phi$ occurs. Equations (1) to (3) below represent an electromagnetic field generated by the microdipole, where a component inversely proportional to the cube of a distance R is an electrostatic field, a component inversely proportional to the square of the distance R is an induction field, and a component inversely proportional to the distance R is a radiation field.

$$E_\theta = \frac{pe^{-jkR}}{4\pi\varepsilon}\left(\frac{1}{R^3} + \frac{jk}{R^2} - \frac{k^2}{R}\right)\sin\theta \tag{1}$$

$$E_R = \frac{pe^{-jkR}}{2\pi\varepsilon}\left(\frac{1}{R^3} + \frac{jk}{R^2}\right)\cos\theta \tag{2}$$

$$H_\phi = \frac{j\omega pe^{-jkR}}{4\pi}\left(\frac{1}{R^2} + \frac{jk}{R}\right)\sin\theta \tag{3}$$

In the close-proximity wireless communication system depicted in FIG. 1, to suppress a disturbing wave to other peripheral systems, it is preferable to use the longitudinal-wave component $E_R$ not containing a component of the radiation field while suppressing the transverse-wave component $E_\theta$ containing a component of the radiation field. This is because, as can be seen from Equations (1) and (2) above, the transverse-wave component $E_\theta$ of the electric field contains a radiation field inversely proportional to the distance (that is, a radiation field with a small distance attenuation), but the longitudinal-wave component $E_R$ does not contain a radiation field.

Figure 6:
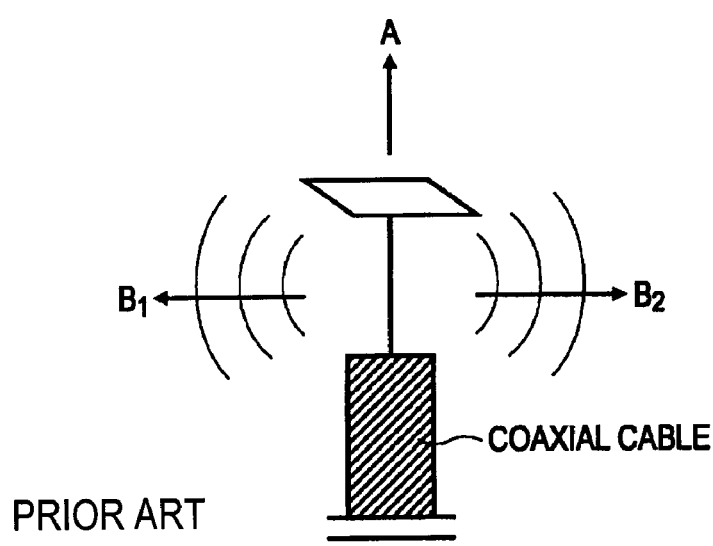
FIG. 6 illustrates an example of the structure of a capacitance-loaded antenna.

First, to prevent the occurrence of the transverse-wave component $E_\theta$ of the electric field, the high-frequency coupler is set so as not to operate as an antenna. The high-frequency coupler depicted in FIG. 2 appears to be similar in structure to a capacitance-loaded antenna having a metal at a tip of an antenna element for providing an electrostatic capacity to shorten the height of the antenna. Thus, the high-frequency coupler is set so as not to operate as a capacitance-loaded antenna. FIG. 6 illustrates an example of the structure of a capacitance-loaded antenna. In FIG. 6, the longitudinal-wave component $E_R$ of the electric field occurs mainly in a direction indicated by an arrow A, and the transverse-wave component $E_\theta$ of the electric field occurs in directions indicated by arrows $B_1$ and $B_2$.

In the example of the structure of the coupling electrode depicted in FIG. 3, the dielectric 15 and the through hole 16 play a role of avoiding coupling between the coupling electrode 14 and the ground 18 and also a role of forming the serial inductor 12. With the serial inductor 12 forming with a sufficient height from the circuit implementation surface of the printed board 17 to the coupling electrode 14, electric-field coupling between the ground 18 and the coupling electrode 14 is avoided, thereby ensuring an electric-field coupling action with the high-frequency coupler on the receiver. However, when the height of the dielectric 15 is long, that is, when the distance from the circuit implementation surface of the printed board 17 to the coupling electrode 14 is not negligible with respect to the use wavelength, the high-frequency coupler acts as a capacitance-loaded antenna, causing the transverse-wave component $E_\theta$ in the directions as indicated by the arrows $B_1$ and $B_2$ in FIG. 6. Therefore, the height of the dielectric 15 is set to have a sufficient length so as to avoid the coupling between the coupling electrode 14 and the ground 18 to obtain characteristics as a high-frequency coupler and to form the serial inductor 12 for acting as an impedance matching circuit, and is set to be short so that radiation of the unwanted transverse-wave component $E_\theta$ due to the current flowing through the serial inductor 12.

On the other hand, it can be found from Equation (2) that the longitudinal-wave component $E_R$ is maximum with an angle θ formed relative to the direction of the microdipole being 0. Therefore, for non-contact communication efficiently using the longitudinal-wave component $E_R$ of the electric field, it is preferable to transmit a high-frequency electric-field signal by disposing the high-frequency coupler on the receiver so as to face with the angle θ formed relative to the direction of the microdipole being 0.

Also, with the resonating unit formed of the serial inductor 12 and the parallel inductor 13, the current of the high-frequency signal flowing into the coupling electrode 14 by the resonating unit can be further increased. As a result, the moment of the microdipole formed of the charges stored in the coupling electrode 14 and the mirror-image charges on a ground side can be increased. With this, a high-frequency electric-field signal formed of the longitudinal-wave component $E_R$ can be efficiently emitted toward a propagation direction with the angle θ formed relative to the direction of the microdipole being 0.

In the high-frequency coupler depicted in FIG. 2, an impedance matching unit has an operation frequency $f_0$ determined by constants $L_1$ and $L_2$ of the parallel inductor and the serial inductor. However, in related art, a lumped constant circuit has a band narrower than that of a distributed constant circuit in a high-frequency circuit. Also, since the constant of the inductor is small with a high frequency, the resonant frequency is disadvantageously shifted due to variations in constant. To get around this, a high-frequency coupler is formed by replacing the lumped constant circuit in the impedance matching unit and the resonating unit with a distributed constant circuit, thereby allowing a wide band.

Figure 7:
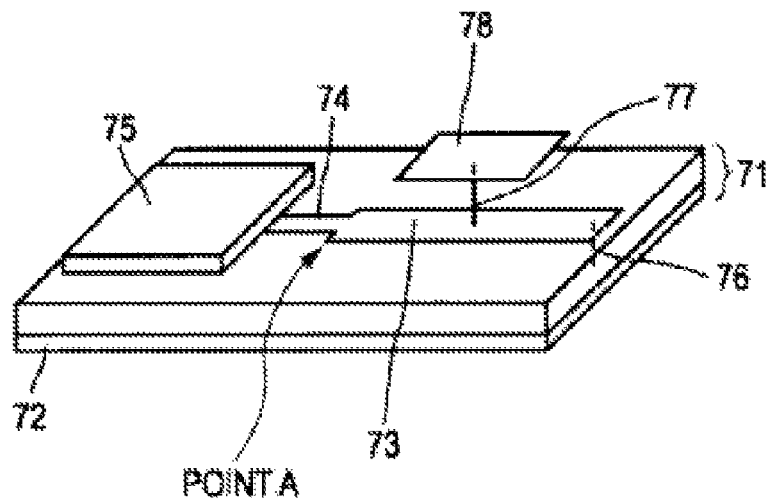
FIG. 7 illustrates an example of the structure of a high-frequency coupler using a distributed constant circuit as an impedance matching unit and a resonating unit.

FIG. 7 illustrates an example of the structure of a high-frequency coupler using a distributed constant circuit as an impedance matching unit and a resonating unit. In the example of FIG. 7, a ground conductor 72 is formed on a lower surface. Also, the high-frequency coupler is disposed on a printed board 71 having an upper surface on which a printed pattern is formed. As the impedance matching unit and the resonating unit of the high-frequency coupler, a microstrip line or coplanar waveguide, that is, a stub 73, is formed acting as a distributed constant circuit in place of the parallel inductor and the serial inductor, and is connected to a transmission and reception circuit module 75 via a pattern of a signal line 74. A tip of the stub 73 is connected to the ground 72 on a lower surface via a through hole 76 penetrating through the printed board 71 for short-circuit. Also, a portion near the center of the stub 73 is connected to a coupling electrode 78 via one terminal 77 made of a thin metal line.

Here, a stub in the technical field of electronics is a generic name for a wire with one end connected and the other end unconnected or grounded, and is provided at some point in a circuit for adjustment, measurement, impedance matching, filtering, or other purposes.

Figure 8:
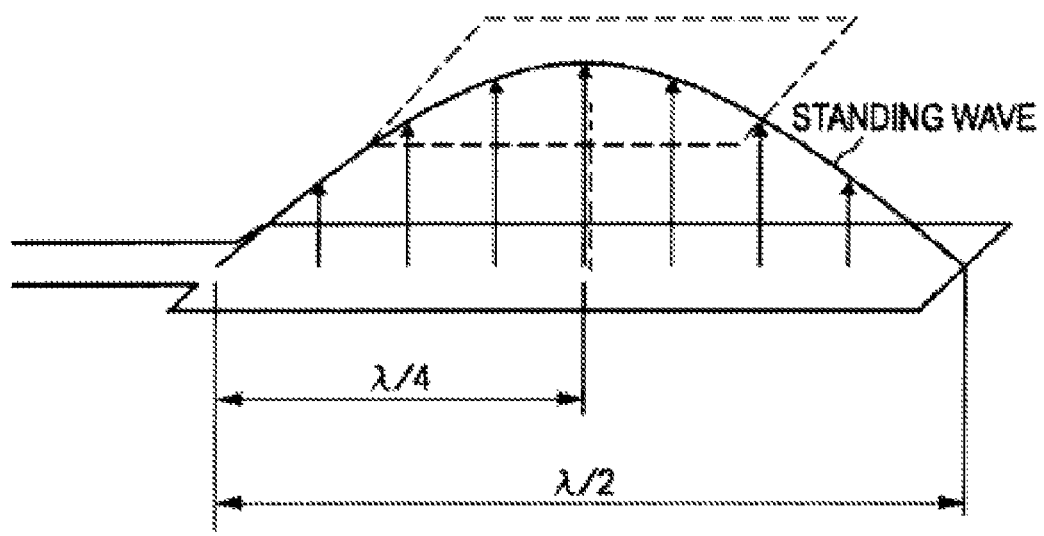
FIG. 8 illustrates the state in which a standing wave occurs on a stub.

Here, a signal input from the transmission and reception circuit via the signal line is reflected at the tip of the stub 73, thereby causing a standing wave in the stub 73. The phase length of the stub 73 is set to be an approximately ½ wavelength of the high-frequency signal (180 degrees of a phase), and the signal line 74 and the stub 73 are formed of a microstrip line, coplanar line, or the like on the printed board 71. As depicted in FIG. 8, when the tip of the stub 73 is short-circuited with a phase length of a ½ wavelength, the voltage amplitude of the standing wave occurring in the stub 73 is 0 at the tip of the stub 73 and is maximum at the center of the stub 73, that is, at a position of a ¼ wavelength (90 degrees) from the tip of the stub 73. With the coupling electrode 78 connected via one terminal 77 to the center of the stub 73 where the voltage amplitude of the standing wave is maximum, a high-frequency coupler with excellent propagation efficiency can be made.

In FIG. 7, the stub 73 is a microstrip line or coplanar waveguide on the printed board 71, and has a small direct-current resistance. Therefore, the loss is small even with a high-frequency signal, and propagation loss between high-frequency couplers can be decreased. Also, the size of the stub 73 forming a distributed constant circuit is large to the extent of an approximately ½ wavelength of the high-frequency signal. Therefore, an error in dimension due to tolerances in fabrication is subtle compared with the entire phase length, thereby hardly producing variations in characteristics.

As described in the Description of the Related Art section, in a usage pattern in which a high-frequency coupler is incorporated in a device, even when the communication distance in the height direction (that is, a propagating direction of an electric-field signal) is short, if the communicable area is extended in the lateral direction (in other words, a direction orthogonal to the propagating direction), an area where a unit serving as a communication target, such as a portable terminal, can be placed is extended, thereby making it easier for the user to use. In the following, a high-frequency coupler configured to extend the communicable area in the lateral direction is described.

Figure 18:
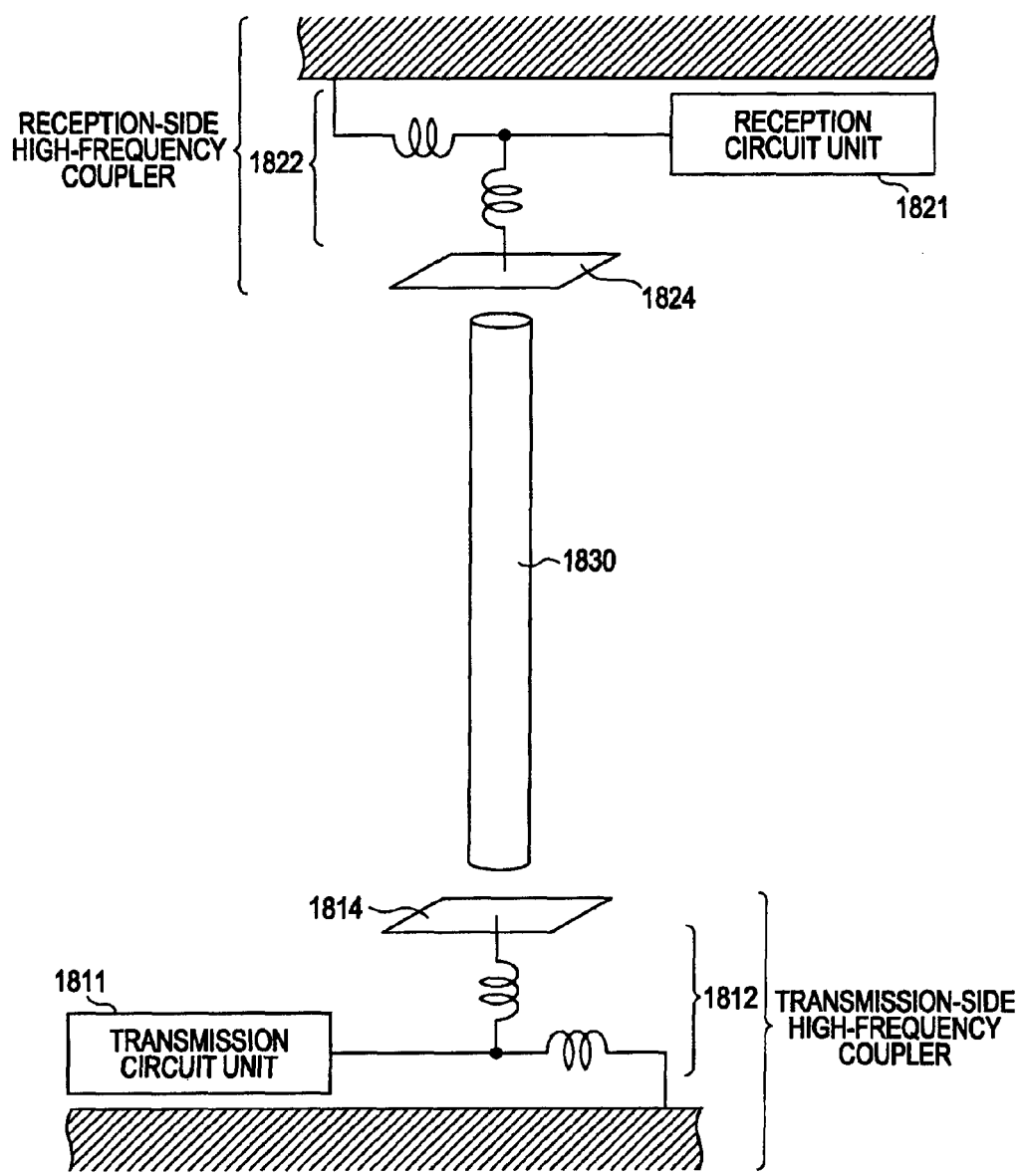
FIG. 18 illustrates an example of the structure of a communication system using a surface-wave transmission line.
Figure 19:
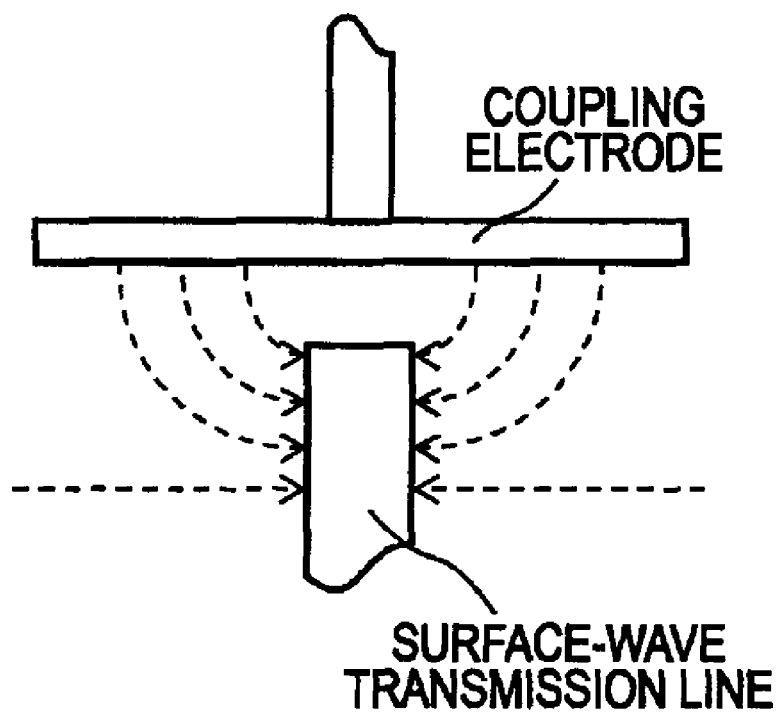
FIG. 19 illustrates the state in which an electric field of a longitudinal-wave component occurring the surface of a coupling electrode of a high-frequency coupler proceeds as a surface wave at an end edge of the surface-wave transmission line.

As described in Japanese Unexamined Patent Application Publication No. 2008-99234, the electric field proceeds along the surface of a conductor. According to an embodiment of the invention described in Japanese Unexamined Patent Application Publication No. 2008-99234, at an end edge of a surface-wave transmission line disposed near a coupling electrode of a high-frequency coupler, an electric-field signal occurring on the surface of the coupling electrode and having a longitudinal-wave component $E_R$ proceeds on the surface of the surface-wave transmission line with an angle of incidence of 90 degrees to be transformed to a transverse wave, which goes around the surface to propagate the signal (refer to FIGS. 18 and 19). In this case, while the communicable area is extended in a height direction, that is, a length direction of the surface-wave transmission line, the communicable area is not extended in a lateral direction (in other words, a direction approximately orthogonal to a signal propagating direction or the length direction of the surface-wave transmission line), and the read surface is not extended.

By contrast, consider the case in which an extended section formed of a conductor extended not in a height direction (that is, a signal propagating direction) but in a lateral direction (in other words, a direction orthogonal to the signal propagating direction) is disposed near the front of the coupling electrode.

Figure 9:
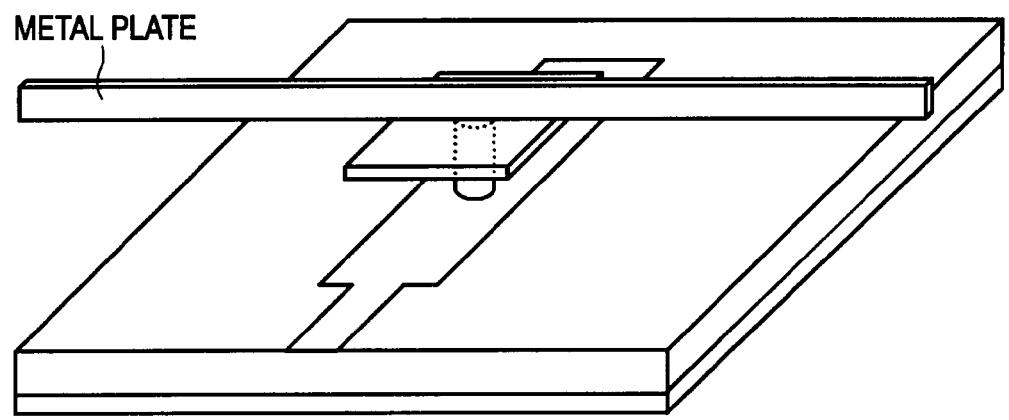
FIG. 9 illustrates an example of the structure of a high-frequency coupler in which an extended section made of a metal plate is disposed near a coupling electrode.

In FIG. 9, as an example of the above-described extended section, a bar-shaped metal plate is disposed so that its length direction approximately matches its lateral direction. However, the coupling electrode and the metal plate are not connected in terms of DC (direct current) and are disposed as close as possible. The coupling electrode and the metal plate are separated from each other in terms of DC so as to prevent a change in the resonance frequency according to DC connection. Also, the metal plate is disposed near the coupling electrode so as to efficiently transmit an electric-field signal occurring on the surface of the coupling electrode to the metal plate. For example, by placing a thin insulating sheet (not shown) between the coupling electrode and the metal plate, a non-DC relation therebetween can be kept.

Here, the front of the coupling electrode does not necessarily mean the surface of the coupling electrode, but is assumed to correspond to a direction with the angle θ formed relative to the direction of the microdipole being approximately 0 (the same goes for the following). As described above, in the direction with the angle θ formed relative to the direction of the microdipole being approximately 0, the strength of the electric-field signal occurring from the coupling electrode becomes approximately maximum, and therefore can be a direction in which non-contact communication is to be performed by efficiently using the longitudinal-wave component $E_R$ of the electric field.

Figure 10:
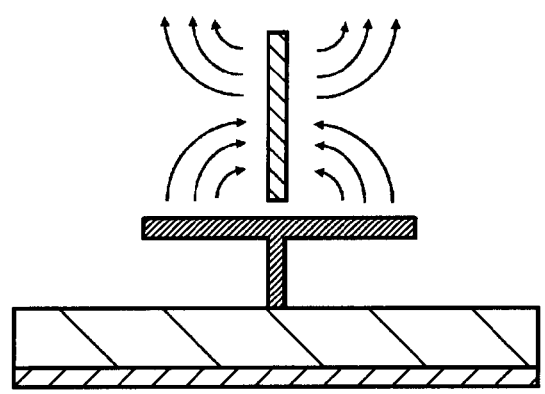
FIG. 10 illustrates the state of an electric field viewed from a direction of a cross-section of the metal plate depicted in FIG. 9.

FIG. 10 illustrates the state of an electric field viewed from a direction of a cross-section of the metal plate depicted in FIG. 9. In the depicted example, the cross-section of the metal plate has a thin rectangular shape that is long in a height direction (or a propagating direction of the electric-field signal) and has a narrow bottom surface. As depicted in FIG. 10, an electric-field signal of the longitudinal-wave component $E_R$ occurring in the front direction of the coupling electrode of the high-frequency coupler does not enter the narrow bottom surface at one end edge of the metal plate, but goes around a side surface to proceed with an angle of incidence of approximately 90 degrees to be transformed to a transverse wave for propagation.

Figure 11:
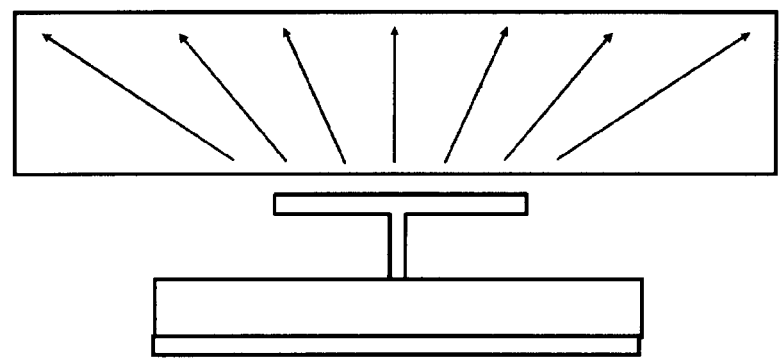
FIG. 11 illustrates the state of propagation of electric-field signals proceeding on a side surface of the metal plate depicted in FIG. 9.

FIG. 11 illustrates the state of propagation of electric-field signals proceeding on a side surface of the metal plate depicted in FIG. 9. As depicted in FIG. 11, an electric-field signal emitted from the coupling electrode approximately radially propagates along the surface of the metal plate, and is emitted into space again from the other end edge of the metal plate.

In this manner, when the extended section formed of a metal plate extended in the lateral direction (in other words, the direction orthogonal to the propagating direction) is disposed near the front of the coupling electrode of the high-frequency coupler, the electric-field signal entering one end edge of the metal plate from the coupling electrode approximately radially propagates in the lateral direction along the surface of the metal plate, and is emitted into space again from the other end edge of the metal plate. When an extended section formed of a conductor, such as a metal plate, is not provided, the propagation area of the electric-field signal depends on the shape and dimension of the coupling electrode. By contrast, when an extended section, such as a metal plate, is provided near the front of the coupling electrode, the propagation area of the electric-field signal can be extended to an area depending on the shape and dimension of the end edge of the metal plate.

Figure 12:
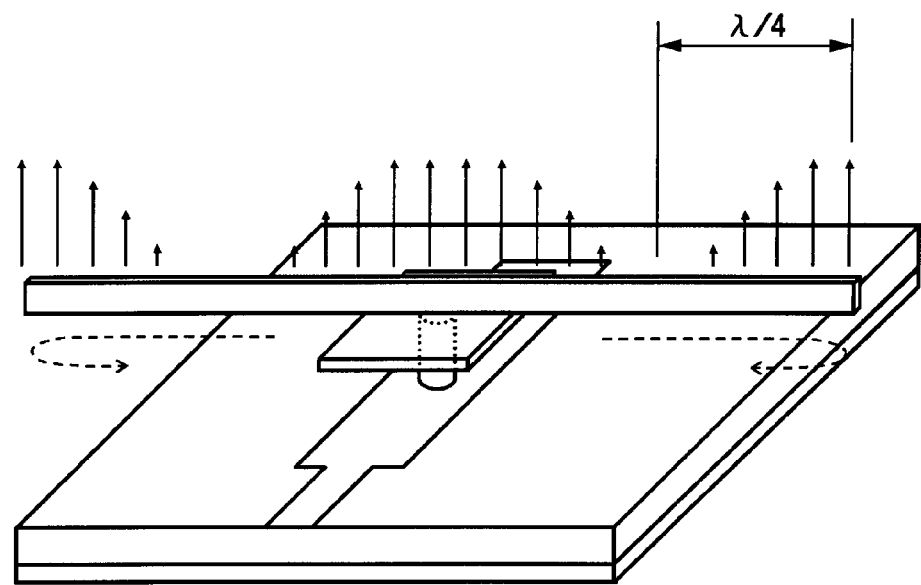
FIG. 12 illustrates the state in which a standing wave occurs in the metal plate with electric-field signals propagating along a length direction of the metal plate being reflected at each end.

Here, when the dimension of the metal plate in the lateral direction has a phase length not negligible with respect to a wavelength λ in use, as depicted in FIG. 12, with the electric-field signal propagating along the length direction of the metal plate reflected at each end, a standing wave occurs in the metal plate. In the example depicted in FIG. 12, the amplitude of the electric-field signal is maximized at both end of an end edge of the metal plate, the electric-field signal has a magnitude of a node of approximately 0 near a position toward the center by a ¼ wavelength from each end, and then the electric-field signal is again increased at portions closer to the center of the end edge.

Even if an extended section formed of a metal plate is used to advantageously extend the communicable area to an area depending on the shape and dimension of the other end edge of the metal plate, the strength of the electric field becomes disadvantageously nonuniform in the communicable area as depicted in FIG. 12 (that is, a strong portion and a weak portion occur in the electric field depending on the place). In this case, it is difficult for the user to know at which position in the extended communicable area the user aims the device for positioning, thereby making it difficult to perform an intuitive operation and provide excellent usability.

Figure 13:
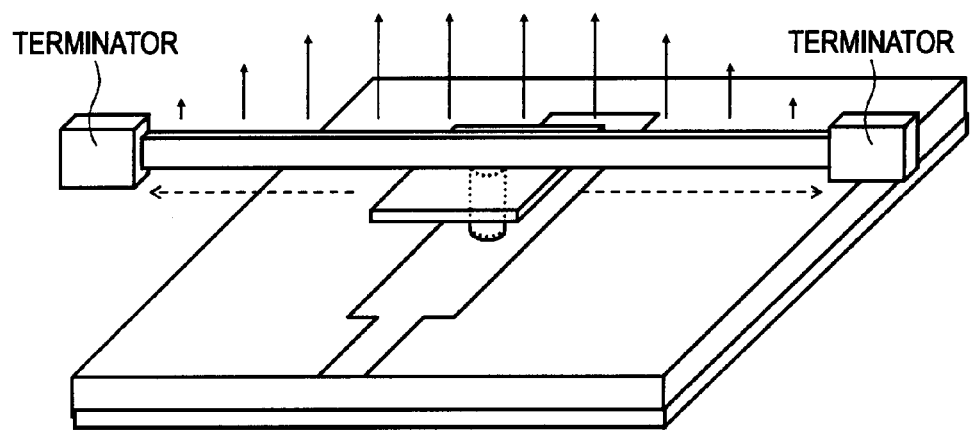
FIG. 13 illustrates the state in which a terminator is mounted on each end of the metal plate to terminate an electric-field signal arriving at the end thereof, thereby preventing the occurrence of a reflected wave.

As depicted in FIG. 12, the amplitude of the electric-field signal is increased at both ends of the end edge of the metal plate because a standing wave occurs due to a reflected wave from each end as an open end. To get around this, as depicted in FIG. 13, a terminator is mounted on each end of the metal plate to terminate the electric-field signal propagating along the length direction of the metal plate and arriving at the end thereof, thereby preventing the occurrence of a reflected wave. As a result, a standing wave does not occur in the metal plate. Therefore, an electric field stronger at portions closer to the center without having a weak electric field portion midway can be formed. As depicted in FIG. 13, an electric field strength distribution can be formed such that the electric field strength is strong near the center of the end edge of the metal plate, is gradually decreased as going away from the center, and is approximately 0 at both ends. Therefore, the communication quality is increased at portions closer to the center of the read surface, and the user can perform an intuitive operation.

Figure 14:
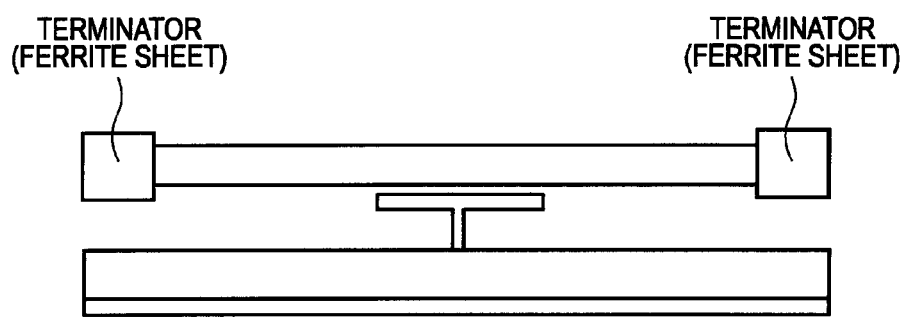
FIG. 14 illustrates an example of the structure of the terminator mounted on each end of the metal plate.

The general description of the embodiments of the present invention is not meant to be restricted to a specific terminator mounted on an end of the metal plate. FIG. 14 illustrates an example of the structure of the terminator mounted on each end of the metal plate. In the depicted example, the terminator is a radio-wave absorbing sheet made of ferrite or the like wound near the end of the metal plate.

Figure 15:
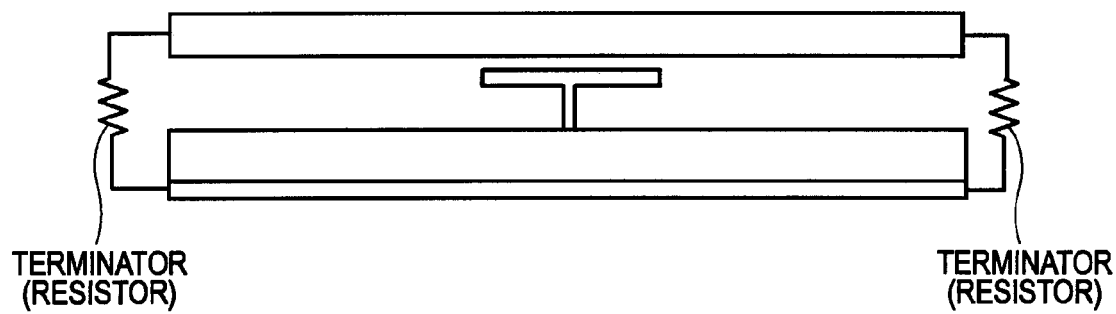
FIG. 15 illustrates another example of the structure of the terminator mounted on each end of the metal plate.

FIG. 15 illustrates another example of the structure of the terminator mounted on each end of the metal plate. In the depicted example, the terminator is an electric resistor short-circuiting the end of the metal plate with the ground.

As depicted in FIGS. 13 to 15, by placing the extended section formed of a metal plate with terminators near the front of the coupling electrode, the electric-field signal entering one end edge of the metal plate from the coupling electrode approximately radially propagates in the lateral direction along the surface of the metal plate and is emitted into space again from the other end edge of the metal plate, thereby extending the communicable area in the lateral direction of the high-frequency coupler. Also, by terminating each end of the metal plate, the electric field strength near the center of the metal plate can be increased. With this, the user can perform an intuitive operation of positioning by aiming at the center of the read surface.

In the examples depicted in FIGS. 13 to 15, a linear metal plate is used as an extended section. Therefore, the communicable area can be extended only along the longitudinal direction. On the other hand, by modifying the structure of the extended section, the communicable area can be extended in another extending direction.

Figure 16:
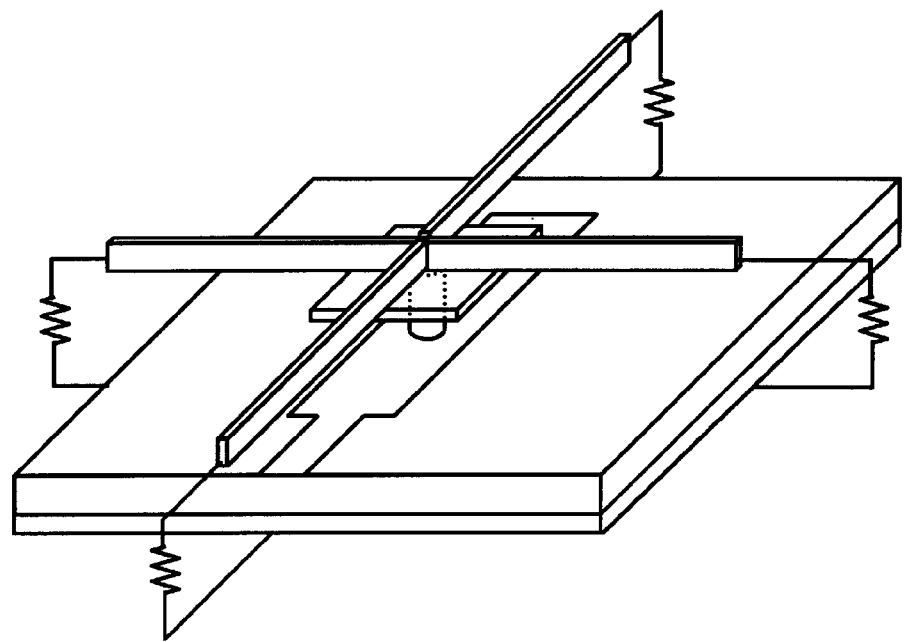
FIG. 16 illustrates an example of the structure of an extended section for extending a communicable area on a plane.

For example, as depicted in FIG. 16, when two (or three or more) linear metal plates each having both ends each terminated with a terminator are radially disposed as crossing, the communicable area of the high-frequency coupler is extended in four directions, that is, approximately on a plane.

Figure 17:
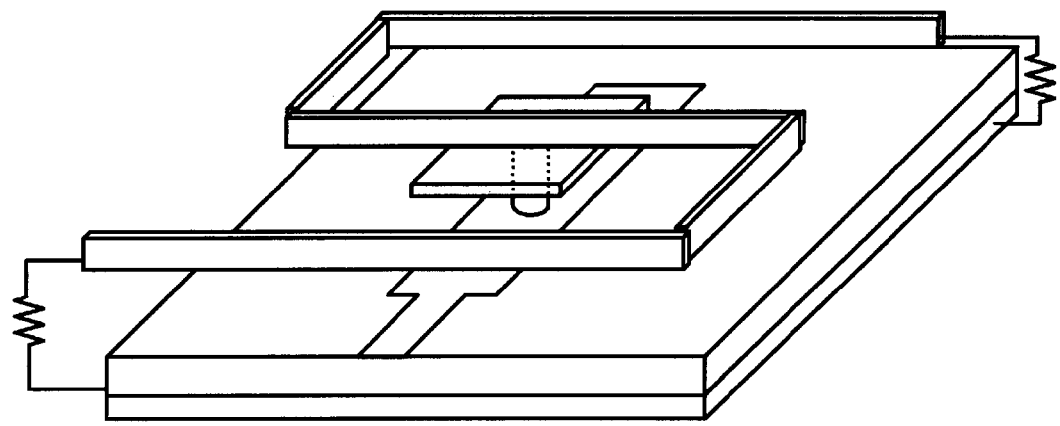
FIG. 17 illustrates another example of the structure of the extended section for extending a communicable area on a plane.

Also, as depicted in FIG. 17, a linear metal plate having a meander structure formed by folding one barstock is terminated with a terminator at each end, and is used as an extended section to be placed near the front of the coupling electrode. With this, the communicable area of the high-frequency coupler is extended along the bending structure of the metal plate, that is, approximately on a plane.

In either example depicted in FIG. 16 or 17, the communicable area of the high-frequency coupler is extended on a plane. Therefore, compared with the case in which the communicable area is linearly extended as depicted in FIGS. 13 to 15, user's operability for positioning the device is further increased.

The extended section formed of a metal plate for use in the high-frequency coupler depicted in FIGS. 13 to 17 is similar to the surface-wave transmission line described in Japanese Unexamined Patent Application Publication No. 2008-99234 considering that the electric-field signal emitted from the front of the coupling electrode proceeds to propagate along the surface. However, an unwanted electric wave may be emitted from an end of the surface-wave transmission line, affecting other systems nearby. By contrast, in the extended section according to the embodiments of the present invention, an unwanted electric-field signal not contributing to communication is attenuated by each terminator. Therefore, an unwanted electric wave is not emitted to the outside.

Figure 20A:
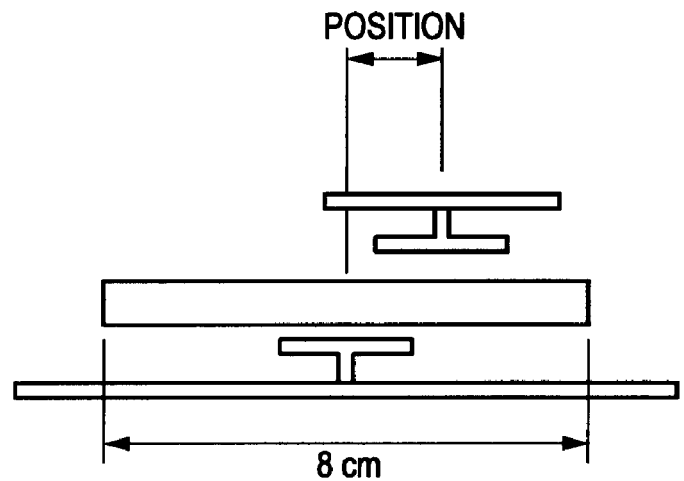
FIG. 20A illustrates a condition of an experiment for measuring a coupling strength between high-frequency couplers.
Figure 20B:
FIG. 20B illustrates a condition of an experiment for measuring a coupling strength between high-frequency couplers.
Figure 20C:
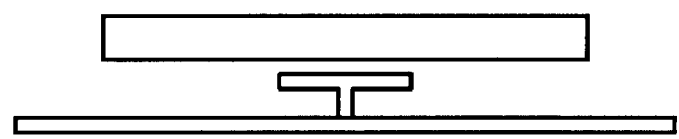
FIG. 20C illustrates a condition of an experiment for measuring a coupling strength between high-frequency couplers.
Figure 20D:
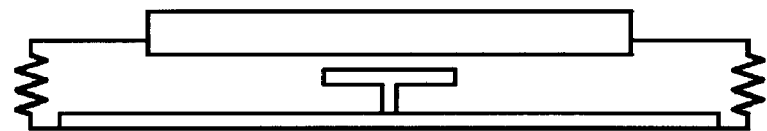
FIG. 20D illustrates a condition of an experiment for measuring a coupling strength between high-frequency couplers.

The inventor measured a coupling strength between the high-frequency couplers. As conditions of an experiment, it is assumed that, as depicted in FIG. 20A, the length of a metal plate for use as the extended section is 8 cm and the coupling electrode as a communication target is disposed so as to face in the communicable area extended by this metal plate. Also, by comparison, the inventor measured a coupling strength without using an extended section (refer to FIG. 20B), by using a metal plate as an extended section (refer to FIG. 20C), and by using a metal plate with terminators mounted on both ends as an extended section (refer to FIG. 20D).

Figure 21:
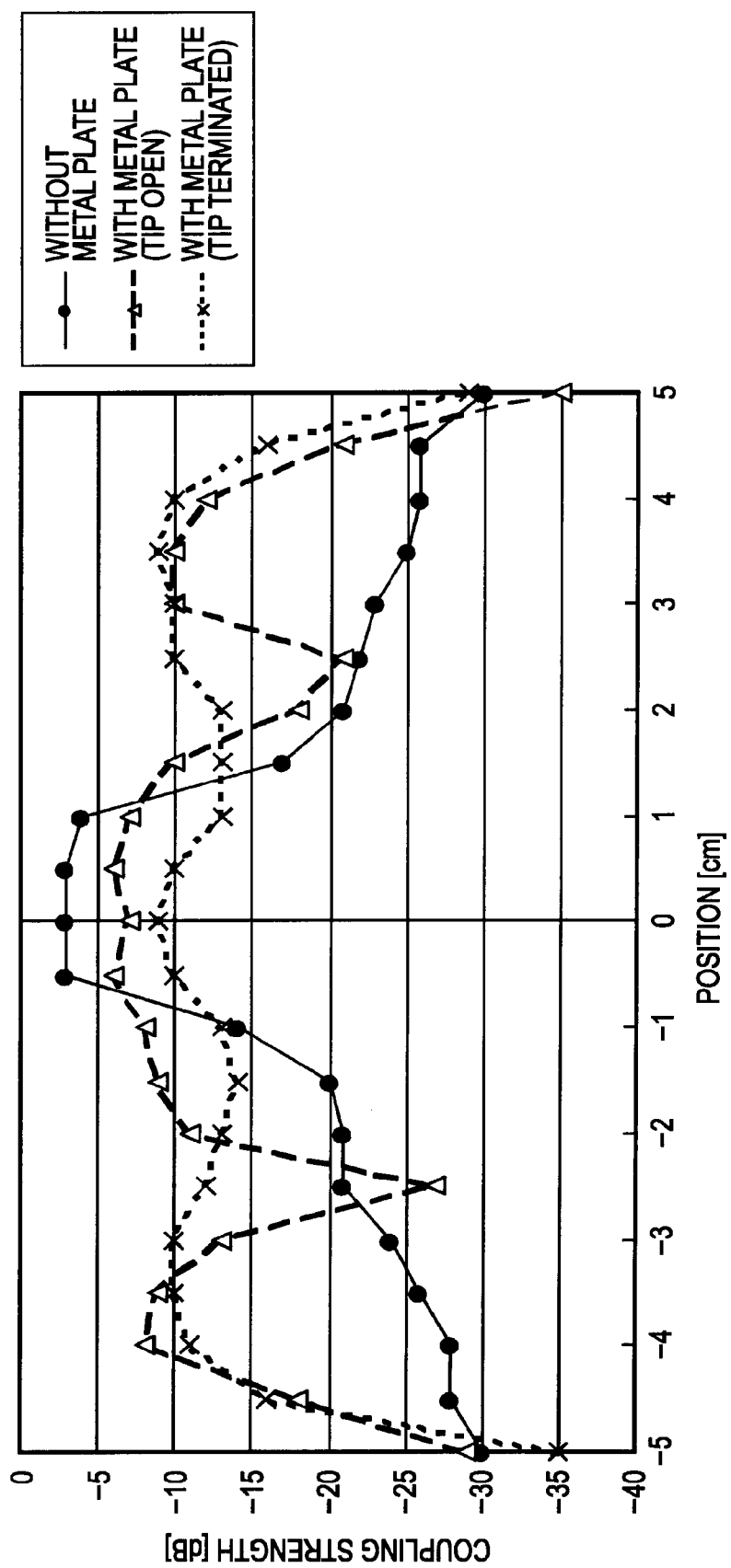
FIG. 21 illustrates results of an experiment for measuring a coupling strength between high-frequency couplers.

FIG. 21 illustrates results of an experiment for measuring a coupling strength between the high-frequency couplers. For example, when communication is possible with a coupling strength of −20 dB or higher, communication is limited within an area of ±1.5 cm without a metal plate. When the metal plate not subjected to a terminating process is placed near the front of the coupling electrode, communication is possible even at a point of ±±4 cm, but a null point where communication is disabled appears inside. When a metal plate with its tip terminated is placed, communication is possible constantly within an area of ±4.5 cm.

Figure 22:
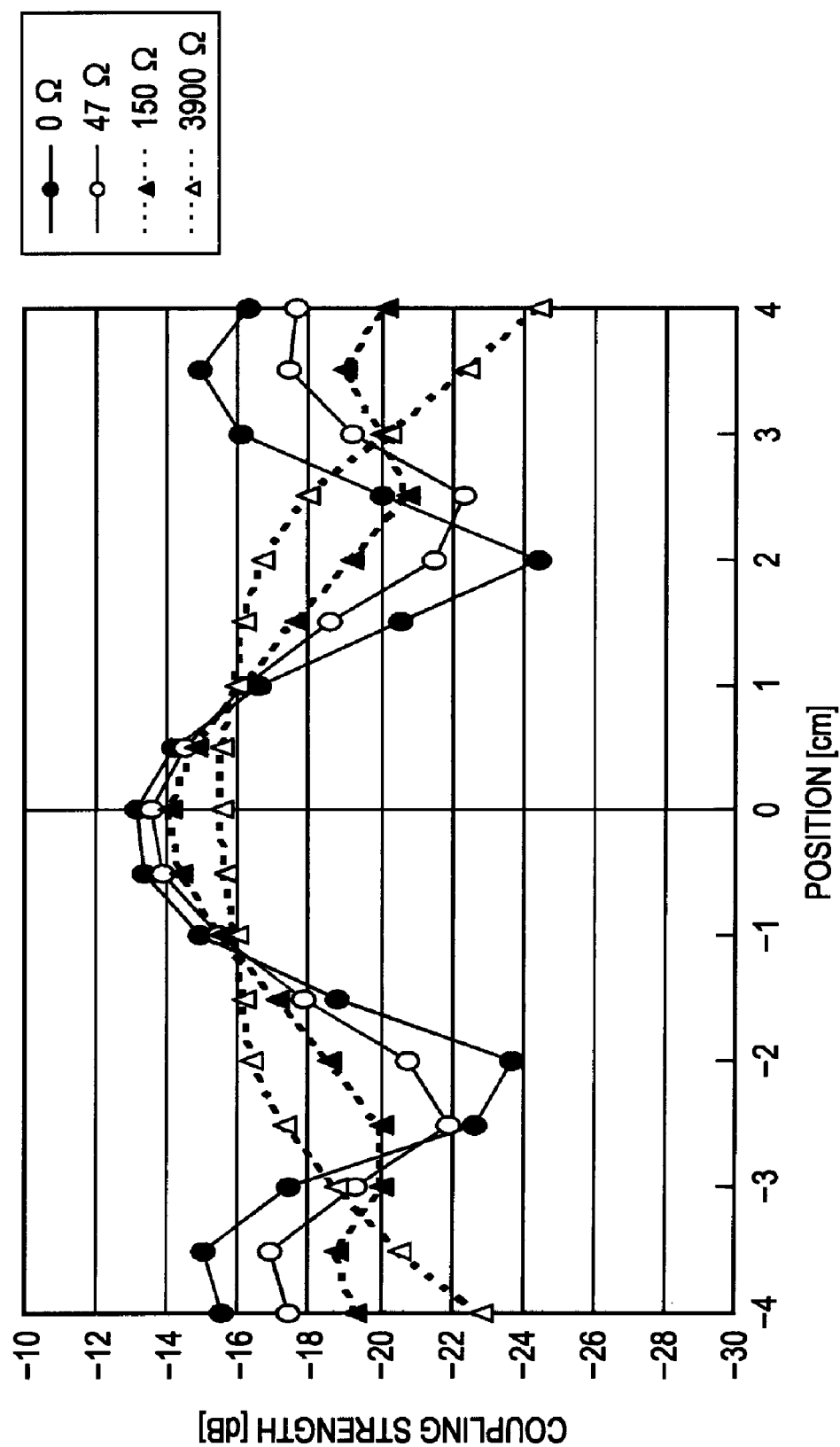
FIG. 22 illustrates results of measuring a coupling strength between high-frequency couplers with a varied terminating resistance when a metal plate having a terminator made of an electric resistor mounted on each end is used as an extended section.

The inventor also measured a coupling strength between the high-frequency couplers with a varied terminating resistance when a metal plate having a terminator made of an electric resistor mounted on each end is used as an extended section. FIG. 22 illustrates results of measuring a coupling strength between high-frequency couplers with a varied terminating resistance. It can be found from FIG. 22 that, while a smooth coupling strength characteristic can be obtained with a shallower null point as the resistance is increased, the coupling strength at a position of 0 cm tends to be weak. To implement an embodiment of the present invention, it is preferable to prevent a communication-disabled area from being created midway and to select an appropriate constant of the terminating resistance with which the coupling strength is not too weak.

Figure 23:
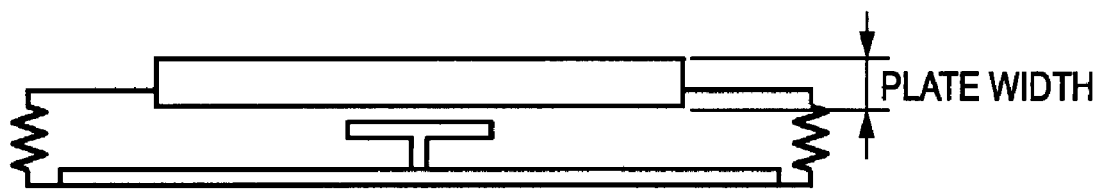
FIG. 23 illustrates the state in which a coupling strength between high-frequency couplers is measured with a varied height (plate width) of a metal plate, the metal plate having a terminator made of an electric resistor mounted on each end being used as an extended section.

The inventor further measured a coupling strength between the high-frequency couplers with a varied height (plate width) of a metal plate, the metal plate having a terminator made of an electric resistor mounted on each end being used as an extended section, as depicted in FIG. 23. Here, the thickness of the metal plate is fixed at 0.2 mm. FIG. 24 illustrates results of measuring a coupling strength between the high-frequency couplers with a varied height (plate width) of the metal plate. It can be found from FIG. 24 that, as the plate width is larger, the coupling strength tends to be weaker and the peak-to-valley width tends to be larger. One possible reason for this is that, as the plate width is increased, the propagation distance is increased to increase a loss accordingly. Another possible reason is that, as the area of the plate is extended, a multipath occurs, thereby easily causing a peak and valley due to interference.

Figure 26A:
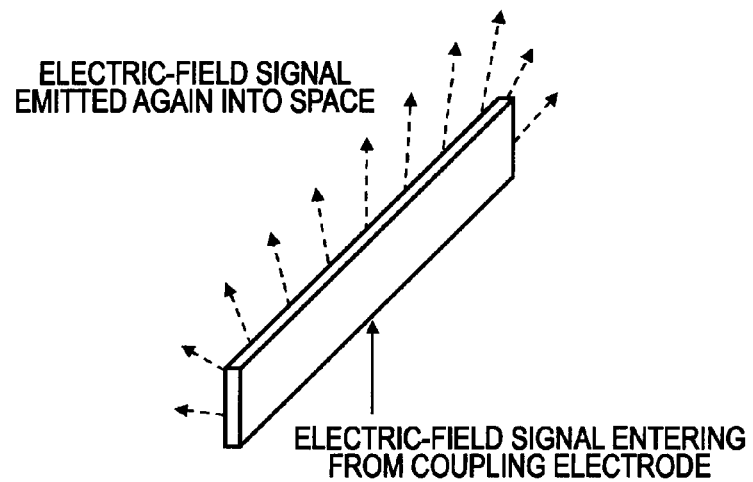
FIG. 26A illustrates the state in which an electric-field signal proceeding from a transmission coupling electrode to an end edge of the metal plate is emitted into space again mainly from the other end edge.
Figure 26B:
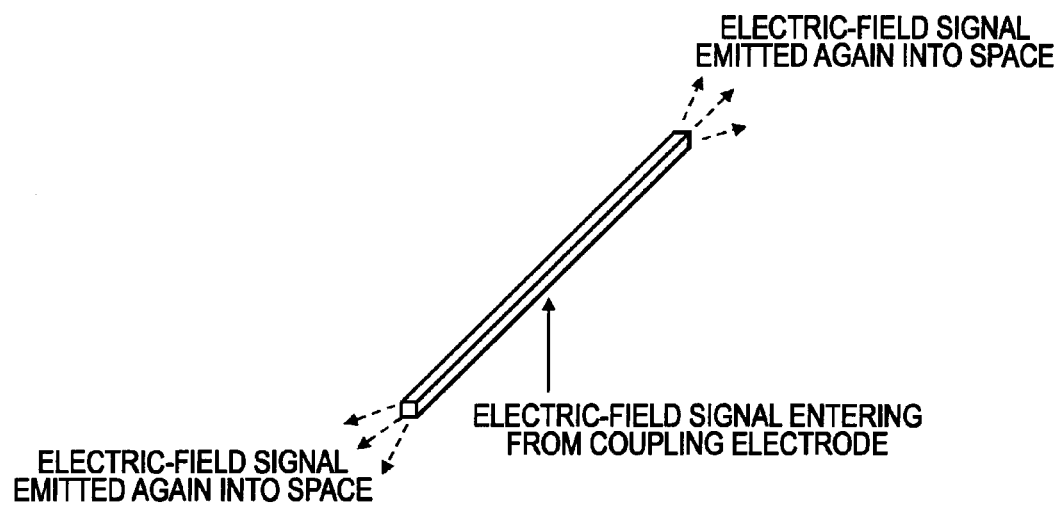
FIG. 26B illustrates the state in which an electric-field signal proceeding from a transmission coupling electrode to the wire propagates in a longitudinal direction and is then emitted into space again mainly from both ends.

The inventor further measured a coupling strength between the high-frequency couplers by using a metal plate having a rectangular shape in cross section and by using a wire, as an extended section, and the measurement results are depicted in FIG. 25. Here, in either case, it is assumed that a terminator made of an electric resistor is mounted on each end. It can be found from FIG. 25 that, compared with the metal plate, the wire has a strong coupling strength at the center (0 cm) and both ends (±4 cm), and has a weak coupling strength therebetween. A possible reason for this is that the propagation distance is short at the center and the wire inherently tends to form a strong electric field at both ends. In the metal plate, an electric-field signal proceeding from the transmission coupling electrode to one end edge of the metal plate is emitted into space again mainly from the other end edge, and a ratio of emission from both ends is thought to be low (refer to FIG. 26A). By contrast, in the wire, the electric-field signal proceeding from the transmission coupling electrode to the wire is thought to propagate in a longitudinal direction and be then emitted into space again mainly from both ends (refer to FIG. 26B).

The present application contains subject matter related to that disclosed in Japanese Priority Patent Application JP 2009-080792 filed in the Japan Patent Office on Mar. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device comprising:
a communication circuit unit processing a high-frequency signal transmitting data;
a transmission path for the high-frequency signal, the transmission path being connected to the communication circuit unit;
a printed board having an upper surface on which a printed pattern is formed, a lower surface, and a through hole penetrating through the printed board;
a ground formed on the lower surface of the printed board;
a coupling electrode separated from the ground and supported to face the ground;
a stub connected to the ground on the lower surface via the through hole and configured to operate as a distributed constant circuit;
a resonating unit increasing a current flowing into the coupling electrode via the transmission path;
an extended section formed of a conductor disposed proximate to a front of the coupling electrode with an angle θ formed relative to a direction of a microdipole being approximately 0 degree, the microdipole formed of a line segment connecting a center of charges stored in the coupling electrode and a center of mirror-image charges stored in the ground, the conductor extends substantially long in the lateral direction approximately orthogonal to a propagating direction of an electric-field signal occurring from the front of the coupling electrode; and
wherein the extended section is a metal plate having a thin rectangular sectional shape with a narrow bottom surface, wherein the extended section further extends in the propagating direction of an electric field signal occurring from the front of the coupling electrode.

2. The communication device according to claim 1, wherein the extended section has a shape that extends in the lateral direction and includes a terminator at each end in the lateral direction.

3. The communication device according to claim 2, wherein the terminator is a radio-wave absorbing sheet wound proximate the end of the extended section.

4. The communication device according to claim 2, wherein the terminator is an electric resistor short-circuiting the end of the extended section with the ground.

5. A high-frequency coupler comprising:
a transmission path for a high-frequency signal;
a printed board having an upper surface on which a printed pattern is formed, a lower surface, and a through hole penetrating through the printed board;
a ground formed on the lower surface of the printed board;
a coupling electrode separated from the ground and supported to face the ground;
a stub connected to the ground on the lower surface via the through hole and configured to operate as a distributed constant circuit;
a resonating unit increasing a current flowing into the coupling electrode via the transmission path;
an extended section formed of a conductor disposed proximate to a front of the coupling electrode with an angle θ formed relative to a direction of a microdipole being approximately 0 degree, the microdipole formed of a line segment connecting a center of charges stored in the coupling electrode and a center of mirror-image charges stored in the ground, the conductor extends substantially long in the lateral direction approximately orthogonal to a propagating direction of an electric-field signal occurring from the front of the coupling electrode; and
wherein the extended section is a metal plate having a thin rectangular sectional shape with a narrow bottom surface, wherein the extended section further extends in the propagating direction of an electric field signal occurring from the front of the coupling electrode.

6. The communication device according to claim 1, wherein a center of the stub is connected to the coupling electrode through a terminal including a metal line.

7. The communication device according to claim 1, wherein the stub includes a tip configured to reflect the high-frequency signal and generate a standing wave in the stub.

8. The communication device according to claim 7, wherein a center of the stub is connected to the coupling electrode through a terminal at a location wherein a voltage amplitude of the standing wave is at a maximum.

9. The communication device according to claim 7, wherein a phase length of the stub is approximately half of a wavelength of the high-frequency signal.

10. The communication device according to claim 1, wherein the metal plate is adjacent to the coupling electrode and configured to receive the electric-field signal from a surface of the coupling electrode.

11. The communication device according to claim 1, wherein the extended section includes a plurality of linear metal plates, wherein each of the linear metal plates includes one terminator mounted on a first end of the metal plate and another terminator mounted on a second end of the metal plate opposite the first end.

12. The communication device according to claim 1, wherein the extended section includes a single metal plate having a meandering structure.

13. The communication device according to claim 12, further comprising a first terminator mounted to a first end of the metal plate and a second terminator mounted to a second end of the metal plate, wherein the first and second terminators are configured to terminate the electric-field signal propagating along the metal plate.

14. The communication device according to claim 5, wherein a center of the stub is connected to the coupling electrode through a terminal including a metal line.

15. The communication device according to claim 5, wherein the stub includes a tip configured to reflect the high-frequency signal and generate a standing wave in the stub.

16. The communication device according to claim 15, wherein a center of the stub is connected to the coupling electrode through a terminal at a location wherein a voltage amplitude of the standing wave is at a maximum.

17. The communication device according to claim 15, wherein a phase length of the stub is approximately half of a wavelength of the high-frequency signal.

* * * * *